(12) United States Patent
Kim et al.

(10) Patent No.: US 9,847,547 B2
(45) Date of Patent: Dec. 19, 2017

(54) METHOD OF MANUFACTURING SECONDARY BATTERY

(71) Applicant: LG CHEM, LTD., Seoul (KR)

(72) Inventors: Jeoung Hwan Kim, Daejeon (KR); Jung Kyu Woo, Daejeon (KR); Min Su Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 252 days.

(21) Appl. No.: 14/533,817

(22) Filed: Nov. 5, 2014

(65) Prior Publication Data

US 2015/0089800 A1    Apr. 2, 2015

Related U.S. Application Data

(63) Continuation of application No. PCT/KR2014/002976, filed on Apr. 7, 2014.

(30) Foreign Application Priority Data

Sep. 30, 2013    (KR) .......... 10-2013-0116300

(51) Int. Cl.
*H01M 10/04* (2006.01)
*H01M 10/052* (2010.01)
*H01M 10/058* (2010.01)

(52) U.S. Cl.
CPC ......... *H01M 10/04* (2013.01); *H01M 10/049* (2013.01); *H01M 10/0481* (2013.01);
(Continued)

(58) Field of Classification Search
CPC ........... H01M 10/0481; H01M 10/049; H01M 10/04; H01M 10/058; H01M 10/052; Y10T 29/4911
(Continued)

(56) References Cited

U.S. PATENT DOCUMENTS

| 6,145,280 A | * | 11/2000 | Daroux | ............... | H01M 2/0275 |
| | | | | | 29/623.2 |
| 2002/0108235 A1 | | 8/2002 | Pasquier et al. | | |
| 2011/0027645 A1 | | 2/2011 | Komatsuki et al. | | |
| 2011/0171503 A1 | * | 7/2011 | Giroud | ............... | H01M 2/0207 |
| | | | | | 429/50 |

(Continued)

FOREIGN PATENT DOCUMENTS

| JP | 2001-210352 A | 8/2001 |
| JP | 2013-149477 A | 8/2013 |

(Continued)

OTHER PUBLICATIONS

International Search Report dated Jul. 11, 2014, issued in PCT/KR2014/002976.
(Continued)

*Primary Examiner* — Stephen Yanchuk
(74) *Attorney, Agent, or Firm* — Birch, Stewart, Kolasch & Birch, LLP

(57) ABSTRACT

Provided is a method of manufacturing a secondary battery, in which scattering of an electrolyte is prevented while a degassing process is performed to prevent a product from being contaminated due to the scattering of the electrolyte. The method of manufacturing the secondary battery includes performing a formation process on a battery cell including a dead space to generate a gas within the battery cell, closing a piercing tool of a gas removing device to form a through hole in the dead space, thereby discharging the gas within the battery cell through the piercing tool, closing a sealing tool of the gas removing device after the gas is discharged to thermally bond an inner portion of the dead space that is adjacent to an electrode assembly within the battery cell, opening the piercing tool in the state where the sealing tool is closed, and opening the sealing tool after the piercing tool is opened.

7 Claims, 12 Drawing Sheets

(52) U.S. Cl.
CPC ........ *H01M 10/052* (2013.01); *H01M 10/058* (2013.01); *Y10T 29/4911* (2015.01)

(58) Field of Classification Search
USPC ........................................................ 29/623.2
See application file for complete search history.

(56) References Cited

U.S. PATENT DOCUMENTS

| | | |
|---|---|---|
| 2013/0244093 A1 | 9/2013 | Min et al. |
| 2013/0244095 A1 | 9/2013 | Min et al. |

FOREIGN PATENT DOCUMENTS

| | | | |
|---|---|---|---|
| KR | 2001-0093447 A | 10/2001 | |
| KR | 2003-0062511 A | 7/2003 | |
| KR | 10-2006-0087333 A | 8/2006 | |
| KR | 10-2012-0009661 A | 2/2012 | |
| KR | 10-2012-0080707 A | 6/2012 | |
| KR | 10-1160762 B1 | 6/2012 | |
| KR | 10-2013-0044705 A | 5/2013 | |
| KR | 10-1306187 B1 | 9/2013 | |
| WO | WO 2012/074212 A2 | 6/2012 | |
| WO | WO 2012/074217 A2 | 6/2012 | |

OTHER PUBLICATIONS

Written Opinion of the International Searching Authority dated Jul. 11, 2014, issued in PCT/KR2014/002976.
Extended European Search Report, dated Aug. 14, 2015, for European Application No. 14806157.5.

\* cited by examiner

METHOD OF MANUFACTURING SECONDARY BATTERY

CROSS-REFERENCE TO RELATED APPLICATIONS

This application is a Continuation of PCT Application PCT/KR2014/002976, filed on Apr. 7, 2014, which claims priority under 35 U.S.C. §119(a) to application No. 10-2013-0116300, filed in the republic of Korea on Sep. 30, 2013, all of which are hereby expressly incorporated by reference into the present application.

TECHNICAL FIELD

The present invention relates to a method of manufacturing a secondary battery, and more particularly, to a method of manufacturing a secondary battery, in which a degassing process is improved to prevent an electrolyte from being scattered, thereby preventing a product from being contaminated due to the scattering of the electrolyte.

BACKGROUND

Recently, lithium secondary batteries that are chargeable/dischargeable and lightweight and have high energy and output densities are being widely used as energy sources for wireless mobile devices. Also, lithium secondary batteries have attracted considerable attention as power sources for hybrid electric vehicles (HEVs), plug-in hybrid electric vehicles (PHEVs), battery electric vehicles (BEVs), and electric vehicles (EVs), which have been developed to solve limitations, such as air pollution and green-house gases, caused by existing internal-combustion engine vehicles that use fossil fuels, such as gasoline and diesel vehicles.

In such a lithium secondary battery, when an initial cycle is performed according to characteristics of the lithium secondary battery, a formation process for activating a cathode active material has to be essentially preceded. In the formation process, a large amount of gas may be generated in a battery cell. Thereafter, the generated gas may be removed through an opened or cut discharge hole. Then, the gas discharge hole may be thermally bonded and sealed. A process in which the gas within the battery cell is discharged, and then the discharge hole is thermally bonded as described above may be commonly called a degassing process. However, in the degassing process according to the related art, an electrolyte stained on a mechanism may be scattered due to the vacuum exhaust to contaminate a product.

Thus, a technology for solving the above-described limitations is needed.

SUMMARY OF THE INVENTION

The present invention provides a method of manufacturing a secondary battery, in which scattering of an electrolyte is prevented when a degassing process is performed to present a product from being contaminated by the scattered electrolyte.

An exemplary embodiment of the present invention, there is provided a method of manufacturing a secondary battery, the method including: performing a formation process on a battery cell including a dead space to generate a gas within the battery cell; closing a piercing tool of a gas removing device to form a through hole in the dead space, thereby discharging the gas within the battery cell through the piercing tool; closing a sealing tool of the gas removing device after the gas is discharged to thermally bond an inner portion of the dead space that is adjacent to an electrode assembly within the battery cell; opening the piercing tool in the state where the sealing tool is closed; and opening the sealing tool after the piercing tool is opened.

Figure 1:
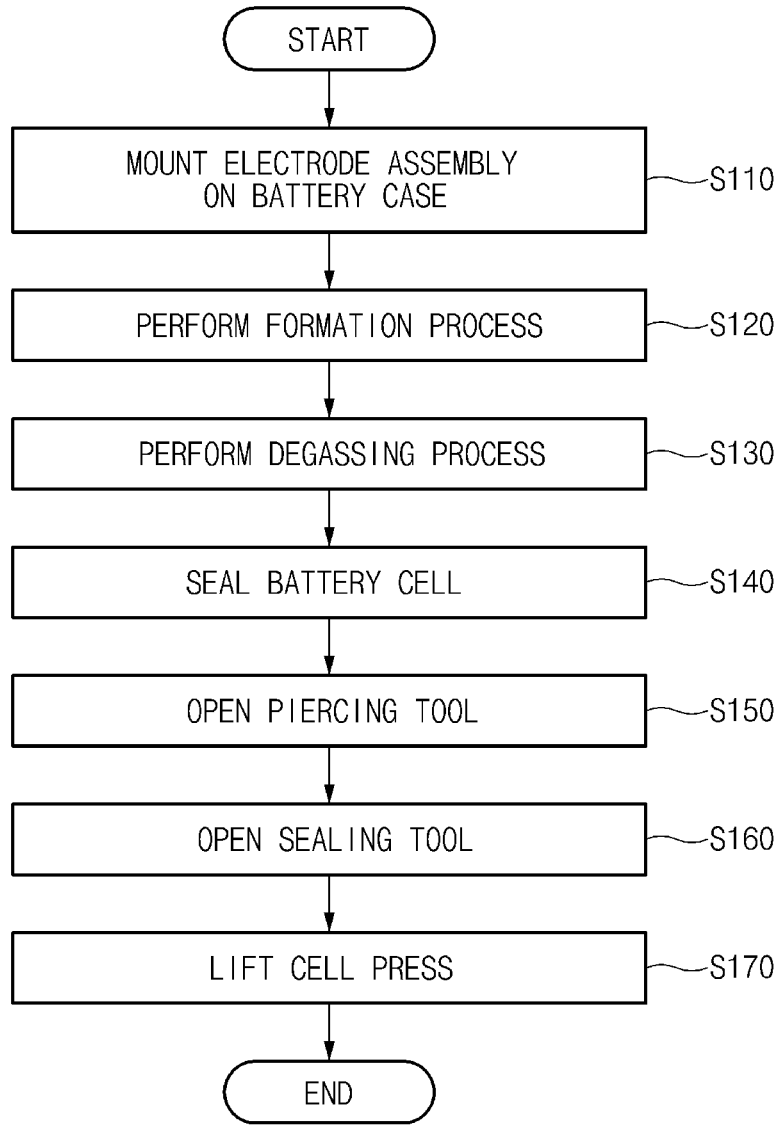
FIG. 1 is a flowchart for explaining a process of manufacturing a secondary battery according to an embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. Prior to this, terms or words used in the present specification and claims should not be interpreted as being limited to typical or dictionary meanings, but should be interpreted as having meanings and concepts which comply with the technical spirit of the present invention, based on the principle that an inventor can appropriately define the concept of the term to describe his/her own invention in the best manner. Therefore, configurations illustrated in the embodiments and the drawings described in the present specification are only the most preferred embodiment of the present invention and do not represent all of the technical spirit of the present invention, and thus it is to be understood that various equivalents and modified examples, which may replace the configurations, are possible when filing the present application.

FIG. 1 is a flowchart for explaining a process of manufacturing a secondary battery according to an embodiment of the present invention. Also, FIGS. 2 to 7 are schematic views illustrating the process of manufacturing the secondary battery, and FIGS. 8 to 11 are views for explaining an operation of each component of a gas removing device when a degassing process is performed.

Figure 2:
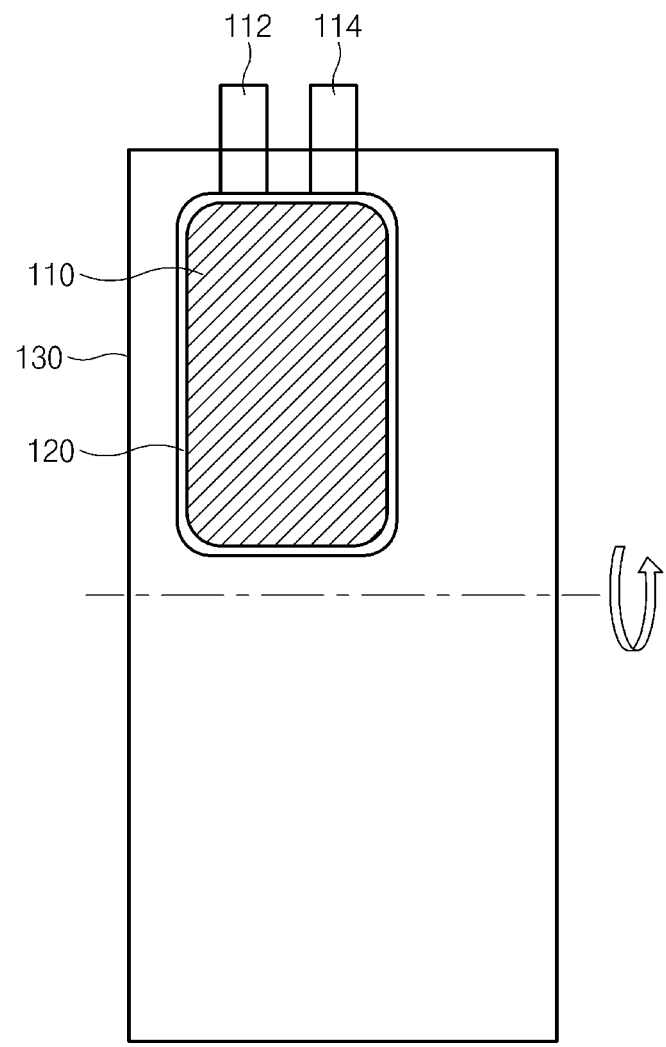
FIGS. 2 to 7 are schematic views illustrating the process of manufacturing the secondary battery.

First, as illustrated in FIG. 2, an electrode assembly 110 to which electrode terminals 112 and 114 are connected is mounted on a receiving part 120 of a battery case 130, and then the battery case 130 is folded in half. Here, since the battery case 130 has a space (a dead space) in which the battery case 130 is cut after collecting a gas generated during a following formation process, the battery case 130 may have a relatively large one side (a right side in FIG. 2) when compared to the other side (S110).

Figure 3:
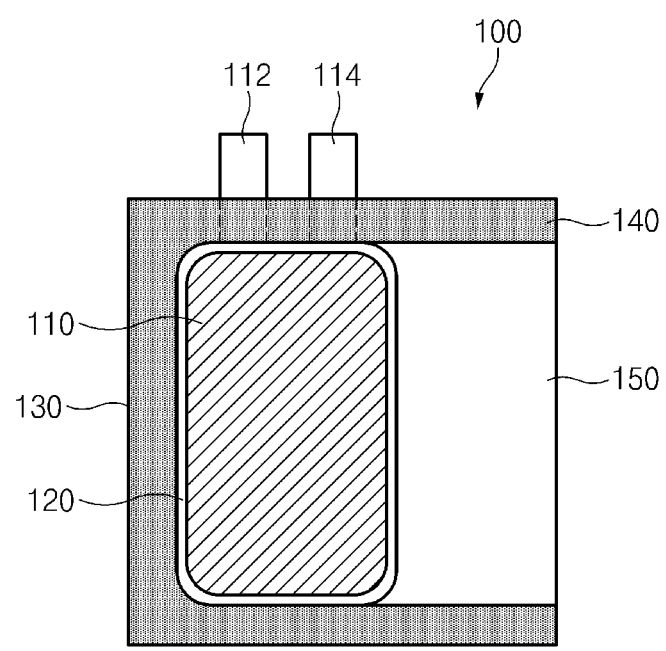
Figure 4:
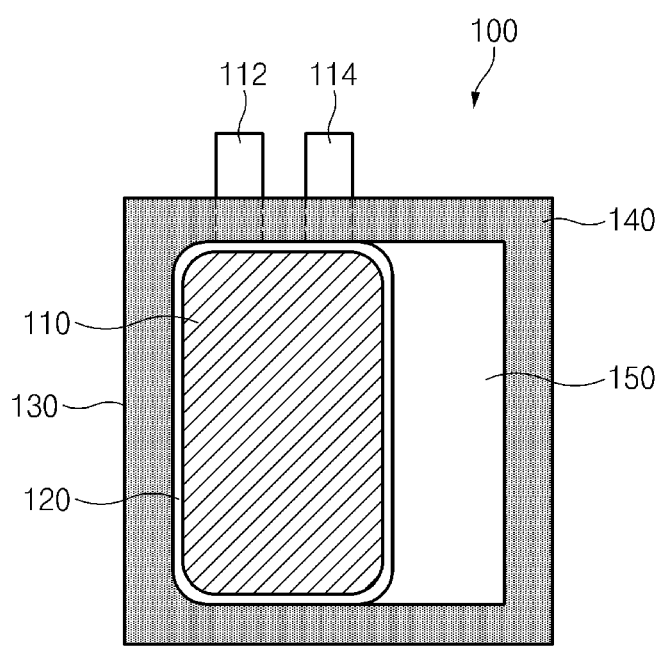

Then, as illustrated in FIG. 3, in a state where the electrode assembly 110 is mounted on the receiving part 120 of the battery case 130, remaining portions 140 except for one side end 150 of an outer circumferential surface of the battery case 130 may be thermally bonded and sealed. Then, an electrolyte may be injected through the non-sealed portion (hereinafter, referred to as the "dead space") 150. Thereafter, as illustrated in FIG. 4, an end 152 of one edge of the dead space 150 may be thermally bonded, and the formation process in which charging/discharging processes are performed to activate a battery cell 100 may be performed (S120).

For example, a defective open circuit voltage may be detected while aging after being fully charged with current of about 0.2 C. Thereafter, a discharge capacity may be measured after being fully discharged again, and then a formation process may be performed in a manner in which the battery cell 100 is charged to about a half of the battery capacity. However, the current embodiment is not limited thereto. For example, the formation process may be performed in various manners that are well-known.

While the formation process is performed, a gas may be generated within the battery cell 100. Here, the generated gas and the excessive electrolyte may be collected into the dead space 150.

Then, a degassing process for removing the gas and excessive electrolyte collected into the dead space 150 is performed (S130).

Figure 5:
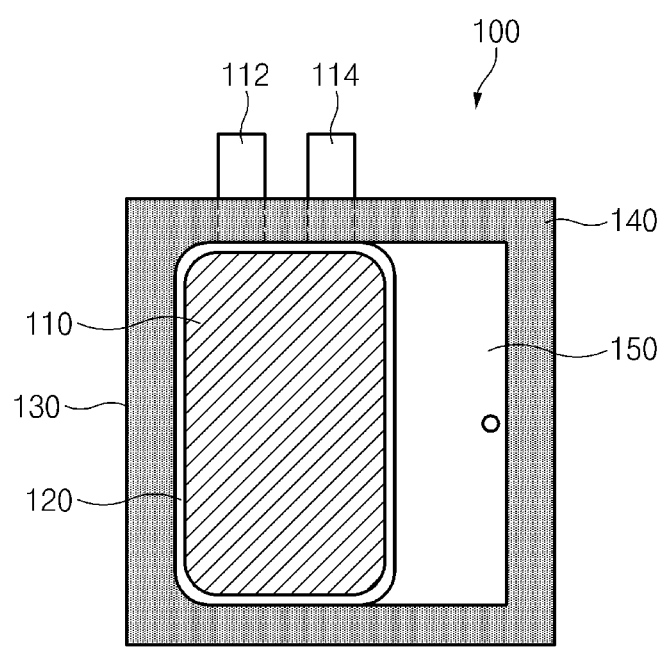
Figure 6:
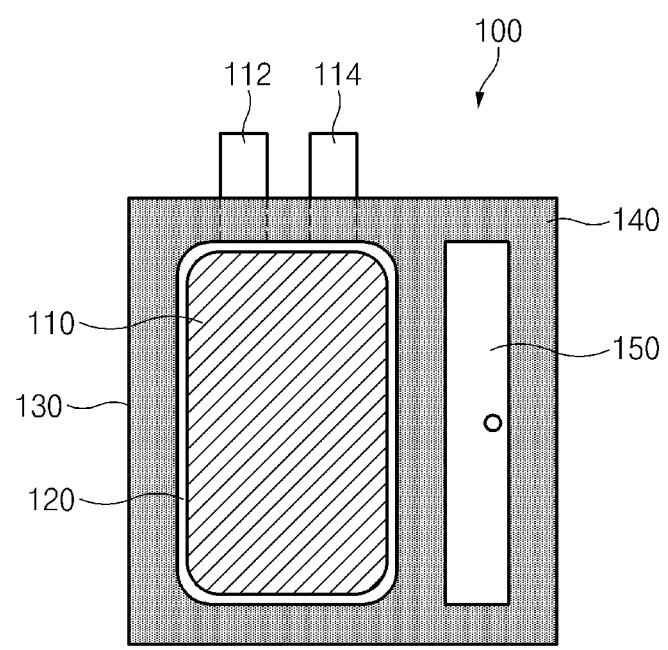
Figure 8:
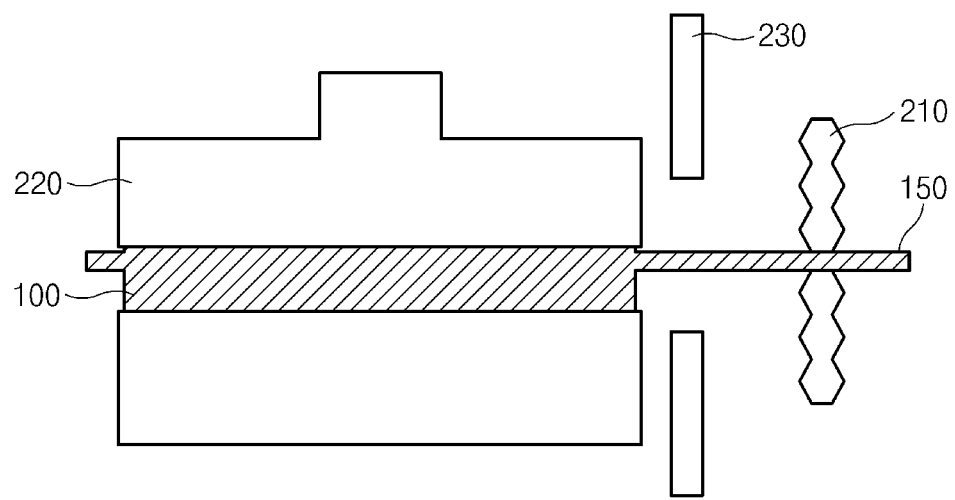
FIGS. 8 to 11 are views for explaining an operation of each component of a gas removing device when a degassing process is performed.
Figure 9:
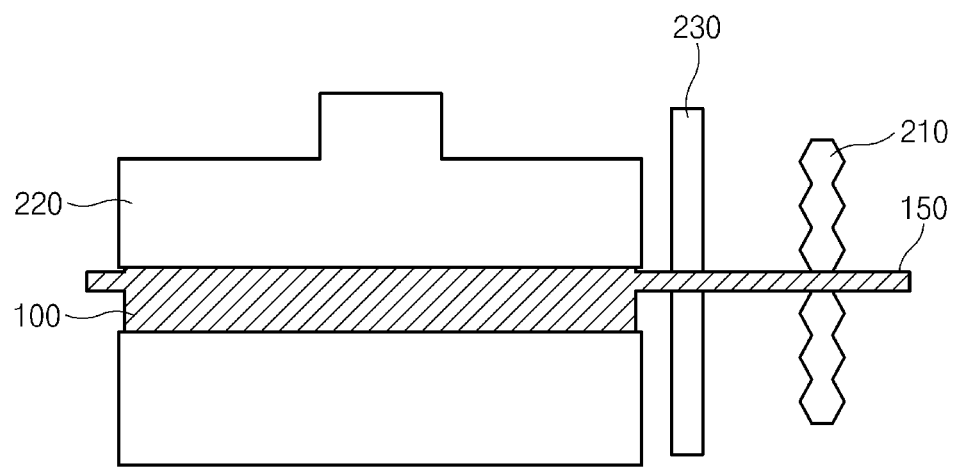

For this, as illustrated in FIG. 8, a piercing tool 210 of a gas removing device is closed to punch top and bottom surfaces of the dead space 150. Thus, as illustrated in FIG. 5, a through hole 154 communicating with the inside of the battery case 130 is formed. Then, the top and bottom surfaces of the dead space 150 are respectively pulled upward and downward while the vacuum is applied into the through hole 154 by using the piercing tool 210 to suction and remove the gas generated during the formation process and the excessive electrolyte through the through hole 154. That is, the gas and excessive electrolyte may be discharged into a vacuum chamber (not shown) through the through hole 154 and the piercing tool 210 by a pressure difference between the inside and outside of the battery cell 100.

Here, a cell press 220 may descend to uniformly push an upper portion of the battery cell 100, thereby applying a pressure to the battery cell 100. That is, since the natural discharge of the gas due to only the pressure difference has a limitation, a pressure may be artificially applied to the battery cell 100 to more effectively discharge the gas. The pressure applied to the battery cell 100 may be about 5 kgf/cm$^2$ to about 15 kgf/cm$^2$. In some cases, only a pressure may be applied to the battery cell 100 by using the cell press 220 without applying the vacuum to discharge the gas.

The excessive electrolyte may be discharged while the gas is discharged. As a result, a portion of the electrolyte may be stained on the piercing tool 210.

When the gas and excessive electrolyte are completely discharged, a sealing tool 230 may be closed in a state where the piercing tool 210 is closed (i.e., the inside of the battery cell is in a vacuum state) to thermally bond and seal an inner portion 156 of the dead space 150 that is adjacent to the electrode assembly 110, thereby sealing the battery cell 110 (S140).

Figure 10:
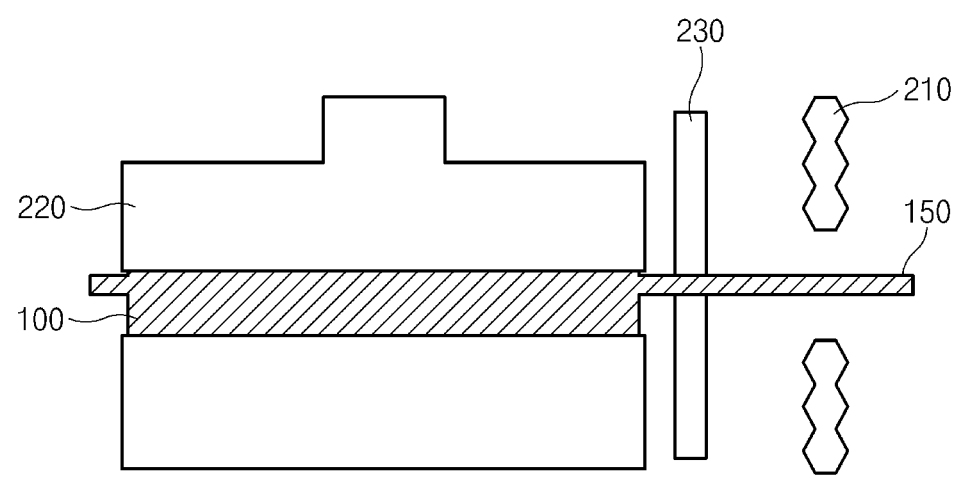

Then, as illustrated in FIG. 10, the piercing tool 210 may be opened first in the state where the sealing tool 230 is closed (S150).

Here, if the excessive electrolyte that is discharged together with the gas during the degassing process is stained on the piercing tool 230, when the piercing tool 230 is opened, the stained electrolyte may be scattered to the surroundings. Particularly, if the electrolyte is scattered toward the battery cell 100 and thus stained on the battery cell 100, the battery cell 100 may be contaminated.

However, in the current embodiment, as illustrated in FIG. 10, the piercing tool 210 may be opened first, in the state where the sealing tool 230 disposed between the battery cell 100 and the piercing tool 210 is closed, to prevent the battery cell 100 from being contaminated by the scattered electrolyte even though the electrolyte is scattered. Furthermore, since the cell press 220 also covers the battery cell 100 when the piercing tool 210 is opened, the contamination of the battery cell 100 due to the scattered electrolyte may be more prevented.

Figure 11:
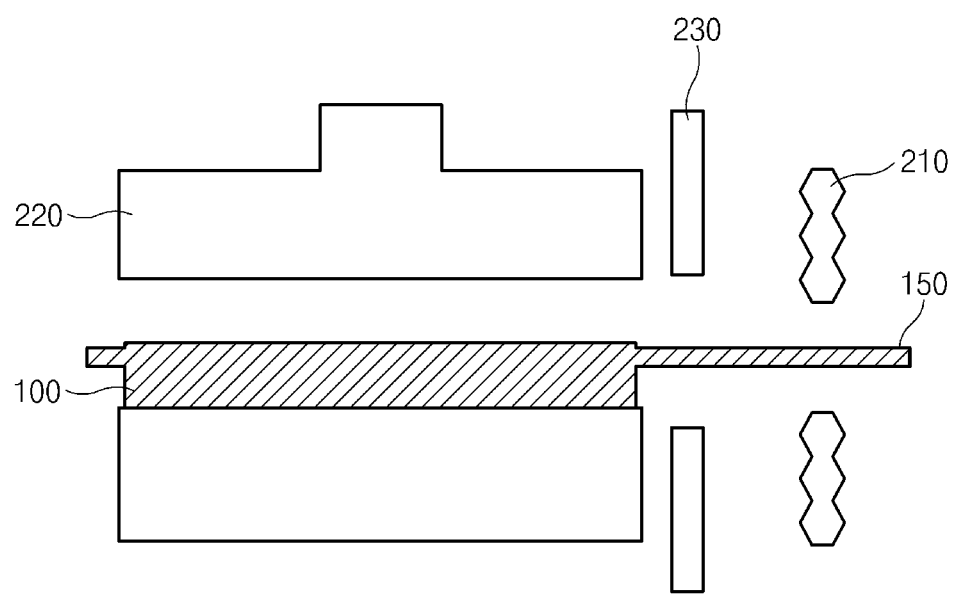

When the piercing tool 210 is completely opened, as illustrated in FIG. 11, the sealing tool 230 may be opened (S160), and the cell press 220 may ascend to release the pressure applied to the battery cell 100 (S160).

Figure 7:
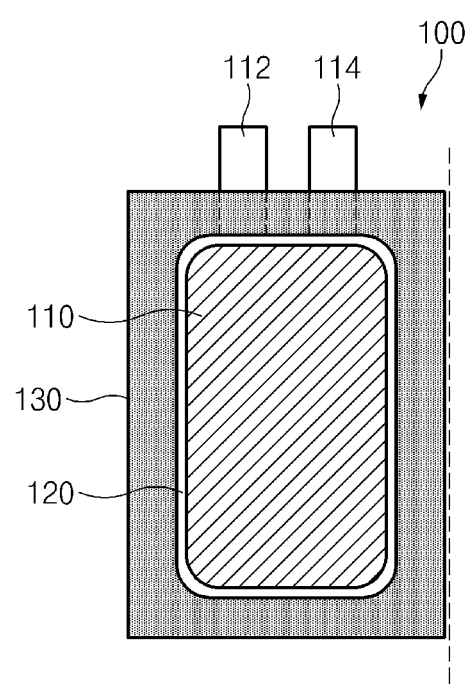

Then, as illustrated in FIG. 7, the portion 156 that is thermally bonded in the operation S140 may be cut to remove the rest dead space 150.

Since following processes are performed through the same method as the conventional processes, their detailed descriptions will be omitted.

The invention has been described in reference to the preferred embodiment; however, as will be apparent to a person skilled in the art, various modifications, changes, substitutions, and additions may be made without departing from the spirit and scope of my invention as described.

Figure 12:
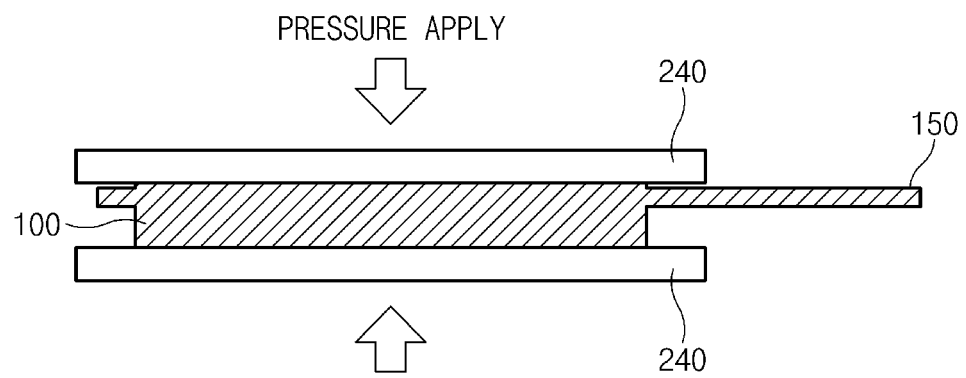
FIG. 12 is a view of a state in which a pressure is applied to a battery cell according to another embodiment.

Although the cell press 220 descends after the battery cell is placed on a fixed support body to apply a pressure to only one side of the battery cell 100 in the foregoing embodiment, the present invention is not limited thereto. For example, as illustrated in FIG. 12, a tray 240 having a plate shape may be disposed on each of upper and lower sides or left and right sides of the battery cell 100 to vertically or horizontally apply a pressure to both sides of the battery cell 100. Therefore, the pressure may be more uniformly applied to the battery cell 100.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

What is claimed is:

1. A method of manufacturing a secondary battery, the method comprising:
    performing a formation process on a battery cell comprising a dead space to generate a gas within the battery cell and to collect the gas and excessive electrolyte in the dead space;
    closing a piercing tool of a gas removing device by moving the piercing tool toward the dead space, punching top and bottom surfaces of the dead space to form a through hole in the dead space, and maintaining a contact at the through hole,
    applying a vacuum to the through hole while the piercing tool remains closed to remove said excessive electrolyte and said gas through the piercing tool,
    closing a sealing tool of the gas removing device after the step of applying the vacuum to bond an inner portion of the dead space that is adjacent to an electrode assembly within the battery cell while the piercing tool remains closed and the inside of the battery cell is in a vacuum state, wherein the closing of the sealing tool comprises moving the sealing tool towards the dead space;

opening the piercing tool after the inner portion of the dead space is bonded in a state in which the sealing tool is closed, wherein the opening of the piercing tool comprises moving the piercing tool away from the dead space; and opening the sealing tool after the piercing tool is opened, wherein the opening of the sealing tool comprises moving the sealing tool away from the dead space.

2. The method of claim 1, further comprising cutting the bonded portion of the dead space to remove the remaining portion of the dead space.

3. The method of claim 1, wherein the discharging of the gas comprises respectively pulling top and bottom surfaces of the dead space upward and downward, respectively while applying the vacuum.

4. The method of claim 1, wherein the discharging of the gas comprises applying a pressure to the battery cell.

5. The method of claim 4, wherein the applying of the pressure comprises applying a pressure to one surface or both surfaces of the battery cell.

6. The method of claim 1, wherein bonding the inner portion of the dead space comprises thermally bonding the dead space by using the sealing tool.

7. The method of claim 1, wherein the bonding of the inner portion of the dead space comprises closing the sealing tool in the state where the piercing tool is closed.

\* \* \* \* \*